(12) United States Patent
Naot et al.

(10) Patent No.: US 9,808,805 B2
(45) Date of Patent: Nov. 7, 2017

(54) LIQUID RESERVOIR FOR MICROGRAVITY SYSTEM

(71) Applicant: SpacePharma SA, Delémont (CH)

(72) Inventors: Ira Naot, Zichron Yaacov (IL); Molly K. Mulligan, Tel Aviv (IL); Alexander Pekin, Ramat-Gan (IL)

(73) Assignee: SpacePharma SA, Delémont (CH)

( * ) Notice: Subject to any disclaimer, the term of this patent is extended or adjusted under 35 U.S.C. 154(b) by 1 day.

(21) Appl. No.: 14/847,011

(22) Filed: Sep. 8, 2015

(65) Prior Publication Data

US 2017/0065975 A1    Mar. 9, 2017

(51) Int. Cl.
*B01L 3/00*     (2006.01)
*B01L 99/00*    (2010.01)

(52) U.S. Cl.
CPC .......... *B01L 3/52* (2013.01); *B01L 3/505* (2013.01); *B01L 3/523* (2013.01); *B01L 2200/027* (2013.01); *B01L 2300/0848* (2013.01); *B01L 2300/0854* (2013.01); *B01L 2300/123* (2013.01)

(58) Field of Classification Search
CPC .................... B01L 3/505; B01L 2300/123
See application file for complete search history.

(56) References Cited

U.S. PATENT DOCUMENTS

| 2,891,700 | A |   | 6/1959 | Maynard |   |
|---|---|---|---|---|---|
| 3,636,607 | A | * | 1/1972 | DeMarco | B21K 25/00 29/419.2 |
| 4,230,119 | A | * | 10/1980 | Blum | A61B 17/12045 604/101.01 |
| 4,317,452 | A | * | 3/1982 | Russo | A61M 27/00 604/541 |
| 5,749,493 | A | * | 5/1998 | Boone | B65D 75/5877 222/105 |
| 2012/0199614 | A1 |   | 8/2012 | Cutting et al. |   |
| 2013/0253479 | A1 | * | 9/2013 | Su | A61M 25/0023 604/544 |
| 2014/0263377 | A1 | * | 9/2014 | Olmedo | A47G 19/2222 220/708 |

FOREIGN PATENT DOCUMENTS

DE    19714057    10/1998

OTHER PUBLICATIONS

International Search Report for PCT application No. PCT/IL2016/050994 dated Dec. 15, 2016.

* cited by examiner

*Primary Examiner* — Paul Hyun
(74) *Attorney, Agent, or Firm* — Pearl Cohen Zedek Latzer Baratz LLP

(57) ABSTRACT

A liquid reservoir for use in a microgravity environment includes a bladder for holding a liquid. The bladder includes flexible walls and an opening for extraction of the liquid from the bladder. An internal structure is shaped so as to form a channel to conduct the liquid from an end of the bladder that is distal to the opening. The internal structure is configured to prevent the walls of the bladder from blocking the channel when suction is applied to the opening.

5 Claims, 4 Drawing Sheets

LIQUID RESERVOIR FOR MICROGRAVITY SYSTEM

FIELD OF THE INVENTION

The present invention relates to microgravity systems. More particularly, the present invention relates to a liquid reservoir for a microgravity system.

BACKGROUND OF THE INVENTION

In some cases, effects of gravity may adversely affect an experimental or industrial process. In such cases, it is often desirable to perform the process in a microgravity environment. When a system is in a microgravity environment, all components of the system are subject to identical or indistinguishable gravitational forces. For example, the system may be in free fall or in orbit about a massive body. In this case, a gravitational contact force between two components of the system, or weight, is absent or negligible.

When the process does not require more than a few seconds of microgravity, the process may be performed in a drop tower or similar facility. Slightly longer processes, e.g., that require nor more than about half a minute of continuous microgravity, may be performed aboard aircraft that fly in an appropriate pattern (e.g., parabolic arcs). Processes that require longer periods of microgravity (e.g., hours, days, or longer) may be performed aboard unmanned or manned spacecraft.

In some cases, a system for performing the process in microgravity may utilize lab-on-a-chip technology or other micro-technology. Use of such technology may enable incorporation of the microgravity system in a platform where available space may be very limited or expensive.

Some such processes require use of liquid materials. A process may require transfer of a liquid from a reservoir to another part of the system, e.g., where the liquid interacts with another component. A process may require transfer of a liquid from the system to a reservoir where the liquid is stored for later use or where a waste liquid is stored. Typically, a flexible liquid reservoir, e.g., in the form of a bag or pouch, enables storage of liquids in a manner that prevents escape of the liquid, conserves space, and enables transfer of the liquid without trapping air or gases which could lead to formation of bubbles.

When a process is performed under normal gravity (e.g., on earth, in an accelerating spacecraft, or in a spacecraft that creates artificial gravity using centrifugal forces), an opening of the liquid reservoir may be placed near the bottom such that gravity causes the liquid to amass at the opening. Thus, applying suction to the opening will readily withdraw the amassed liquid. However, due to the absence of significant gravitational forces in a microgravity environment, a rigid container is not suitable for storing liquids for use by a system. Due to the weightlessness, the liquid, possibly held in a single mass by surface tension, may freely float within the rigid container. In the absence of a force that holds the liquid to a wall of the container, the liquid cannot be drawn by suction into a conduit. Therefore, fluids for use with a microgravity system are commonly held in flexible bags or bladders.

SUMMARY OF THE INVENTION

There is thus provided, in accordance with an embodiment of the present invention, a liquid reservoir for use in a microgravity environment, the reservoir including: a bladder for holding a liquid, the bladder including flexible walls and an opening for extraction of the liquid from the bladder; and an internal structure that is shaped so as to form at least one channel to conduct the liquid from an end of the bladder that is distal to the opening, the internal structure configured to prevent the walls of the bladder from blocking the at least one channel when suction is applied to the opening.

Furthermore, in accordance with an embodiment of the present invention, the reservoir includes an additional opening at an end of the bladder that is distal to the opening.

Furthermore, in accordance with an embodiment of the present invention, the channel includes a hollow interior of the internal structure.

Furthermore, in accordance with an embodiment of the present invention, the internal structure includes a hollow tube.

Furthermore, in accordance with an embodiment of the present invention, the tube extends from the opening to the distal end.

Furthermore, in accordance with an embodiment of the present invention, the tube includes a plurality of perforations distributed along the length of the tube to enable the liquid the liquid to enter the channel through the perforations.

Furthermore, in accordance with an embodiment of the present invention, the internal structure includes a plurality of projections that laterally extend from a longitudinal bar.

Furthermore, in accordance with an embodiment of the present invention, each of the plurality of projections includes a longitudinal fin, wherein each channel of the at least one channel is formed between each pair of adjacent fins.

Furthermore, in accordance with an embodiment of the present invention, the bar extends from the opening to the distal end.

Furthermore, in accordance with an embodiment of the present invention, the internal structure includes a plurality of ribs that project inward from the walls of the bladder.

Furthermore, in accordance with an embodiment of the present invention, a rib of the plurality of ribs longitudinally extends from the opening to the distal end.

Furthermore, in accordance with an embodiment of the present invention, each channel of the at least one channel is formed between adjacent ribs of the plurality of ribs when the walls of the bladder are collapsed.

There is further provided, in accordance with an embodiment of the present invention, a fluid handling system for operation in a microgravity environment, the system including: at least one liquid reservoir, the reservoir including a bladder for holding a liquid, the bladder including flexible walls and an opening for extraction of the liquid from the bladder, the reservoir further including an internal structure that is shaped so as to form at least one channel to conduct the liquid from an end of the bladder that is distal to the opening, the internal structure being sufficiently rigid so as to prevent the walls of the bladder from blocking the at least one channel when suction is applied to the opening; and at least one conduit to conduct the liquid from the reservoir to a process chamber.

Furthermore, in accordance with an embodiment of the present invention, the system includes a pump to extract the liquid from the at least one liquid reservoir into the at least one conduit.

Furthermore, in accordance with an embodiment of the present invention, the process chamber is incorporated into a microfluidic chip.

Furthermore, in accordance with an embodiment of the present invention, a reservoir of the at least one liquid reservoir is configured to hold a product liquid that is produced in the process chamber.

Furthermore, in accordance with an embodiment of the present invention, the system includes a conduit to conduct the product liquid from the process chamber to the reservoir of the at least one liquid reservoir.

Furthermore, in accordance with an embodiment of the present invention, the product liquid comprises a waste liquid.

Furthermore, in accordance with an embodiment of the present invention, a component of the system is enclosed within a pressure chamber.

BRIEF DESCRIPTION OF THE DRAWINGS

In order for the present invention, to be better understood and for its practical applications to be appreciated, the following Figures are provided and referenced hereafter. It should be noted that the Figures are given as examples only and in no way limit the scope of the invention. Like components are denoted by like reference numerals.

DETAILED DESCRIPTION OF THE INVENTION

Figure 1:
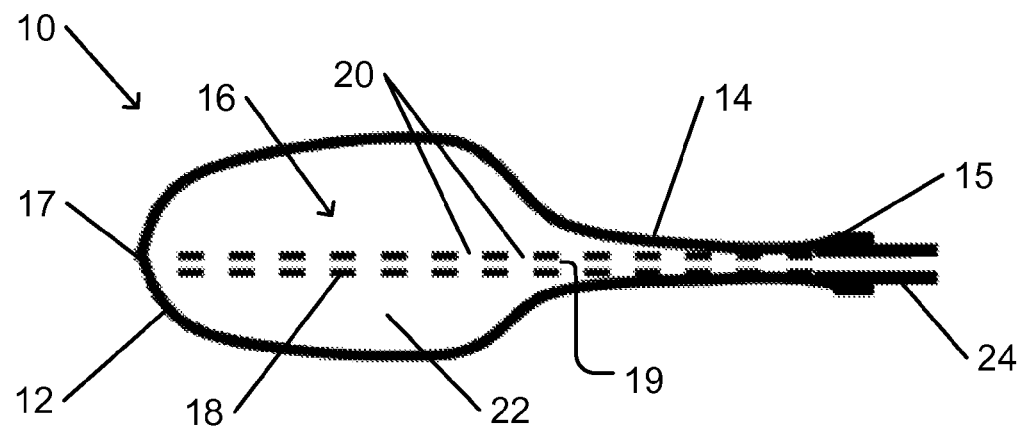
FIG. 1 schematically illustrates a flexible liquid reservoir with a linear central structure for use with a microgravity system, in accordance with an embodiment of the present invention.

In the following detailed description, numerous specific details are set forth in order to provide a thorough understanding of the invention. However, it will be understood by those of ordinary skill in the art that the invention may be practiced without these specific details. In other instances, well-known methods, procedures, components, modules, units and/or circuits have not been described in detail so as not to obscure the invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium (e.g., a memory) that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently. Unless otherwise indicated, us of the conjunction "or" as used herein is to be understood as inclusive (any or all of the stated options).

Some embodiments of the invention may include an article such as a computer or processor readable medium, or a computer or processor non-transitory storage medium, such as for example a memory, a disk drive, or a USB flash memory, encoding, including or storing instructions, e.g., computer-executable instructions, which when executed by a processor or controller, carry out methods disclosed herein.

In accordance with an embodiment of the present invention, a flexible liquid reservoir for use in or with a microgravity system is in the form of a flexible bladder with flexible walls. The bladder is provided with a collapse-preventing internal mechanical structure. For example, the microgravity system may include a micro-fluidic system that is incorporated into a chip or other structure for secure placement in a microgravity environment (e.g., satellite or other spacecraft, or an appropriate pod or bay of an aircraft or drop tower). The bladder of the flexible liquid reservoir may be in the form of a bag, sac, or pouch that is constructed of a flexible material that is impermeable to the liquid (e.g., similar in structure to a bag that is typically used to provide fluid for an intravenous infusion). Similarly, the material of the bladder bag may be impermeable to air or other ambient gasses. For example, the flexible liquid reservoir may be constructed of a flexible plastic or appropriate rubberlike material. The material may be biocompatible with one or more biological materials (e.g., the liquid or a component of the liquid). The material may be selected to prevent a reaction with a liquid or a component of a liquid. The bladder may include one or more openings or ports that are connectable to cooperating structure of the microgravity system.

The internal mechanical structure is configured to maintain one or more channels for passage or conduction of liquid contents of the reservoir from a part of the bladder that is distal to an opening of the reservoir to the opening of the reservoir. For example, the internal mechanical structure may provide channels from all or most interior points within the volume of the reservoir to the opening. The internal mechanical structure may be sufficiently rigid and appropriately shaped such that if the walls of the bladder collapse due to suction that is applied to the opening, the collapse of the walls does not block the channels.

The liquid may then be transferred from the reservoir to another component of the microgravity system or from another component of the microgravity system to the flexible liquid reservoir. The internal mechanical structure is configured to prevent inward collapse of the sides of the flexible liquid reservoir, or of the neck of the flexible liquid reservoir, when the liquid is being withdrawn from the flexible liquid reservoir.

Inward collapse or pinching of opposite walls of a flexible reservoir, or of a neck of the reservoir, were it allowed to occur, could form an obstruction that could prevent removal of all of the liquid contents of the reservoir when the reservoir, e.g., in the form of a simple bag or bladder, is partially filled. For example, the obstruction could lie between the neck or opening of the reservoir, and the part of the reservoir in which remaining liquid is currently found. Applying increased suction to remove the liquid contents in such a case of collapsed walls or neck could exacerbate the problem by increasing the collapse. Similarly, if the walls or neck of an empty flexible reservoir would be allowed to collapse, excessive pressure could be required to force a liquid into the reservoir. Thus, internal mechanical structure to prevent such collapse, in accordance with an embodiment of the present invention, would be advantageous.

Internal mechanical structure to prevent collapse of a bladder of a flexible liquid reservoir, in accordance with an embodiment of the present invention, may include an internal hollow tube. The internal tube may extend from a neck of the flexible liquid reservoir along the length of the flexible liquid reservoir to an opposite end. The internal tube may be sufficiently rigid to prevent total or complete collapse of the flexible liquid reservoir. Thus, the hollow interior of the internal tube may ensure a channel for passage of liquid contents from the opposite end of the flexible liquid reservoir to the neck of the flexible liquid reservoir.

The wall of the tube may include perforations that are distributed along the length of the tube and about its outer wall. The perforations may facilitate removal of liquid that is distributed along the length of the flexible liquid reservoir.

Alternatively or in addition, the internal mechanical structure may include a central longitudinal bar that extends along the length of the flexible liquid reservoir, e.g., from a neck of the flexible liquid reservoir to an opposite wall. A plurality of rigid radial projections, e.g., in the form of ribs, fins, arms, ridges, wings, teeth, or other structures, may radiate or extend laterally outward from a central bar. The structures may be axially elongated (e.g., as axially aligned fins or wings). For example, a cross section perpendicular to a linear axis of the bar may have a cross section in the form of a multi-pointed star, cog, sprocket, asterisk, or similar structure. The radially extending structures form and maintain a plurality of unobstructed grooves or channels between the structures. Thus, a liquid may flow from one end of the flexible liquid reservoir to the other within the unobstructed channels.

Alternatively or in addition, all or part of an inner wall of the flexible liquid reservoir may be ribbed. The ribs may act as spacers to prevent complete collapse toward each other of opposite walls of the flexible liquid reservoir.

A flexible liquid reservoir with an internal mechanical structure, in accordance with an embodiment of the present invention, may be advantageous over other described solutions for liquid storage under microgravity conditions. A flexible liquid reservoir, in accordance with an embodiment of the present invention, may be lighter and less complex than a previously described inflatable bladder that is held within a rigid container (which may be pressurized by gas). Such bladders within rigid containers would typically be thin and thus subject to wear, weakening, or tearing. A flexible liquid reservoir, in accordance with an embodiment of the present invention, may be held at ambient pressure, may be advantageous over a previously described system where the interior of a bladder is pressurized, which would require complex pressure control.

In accordance with an embodiment of the present invention, an internal mechanical structure of a flexible liquid reservoir may include a central linear structure. For example, the central linear structure may be semi-rigid in that the structure is sufficiently rigid to maintain a channel for conduction of liquid from one end of the flexible liquid reservoir to the other. On the other hand, the central linear structure may be sufficiently flexible as to bend to some extent along its central axis.

FIG. 1 schematically illustrates a flexible liquid reservoir with a linear central structure for use with a microgravity system, in accordance with an embodiment of the present invention.

Wall 12 of flexible liquid reservoir 10 is shaped in the form of a flexible bag or bladder. For example, reservoir wall 12 may be made of a suitable rubber, plastic, or other material that is both flexible (e.g., sufficiently thin to enable flexibility) and impermeable to a liquid that is to be stored in flexible liquid reservoir 10. Liquids may be removed from flexible liquid reservoir 10 or added to flexible liquid reservoir 10 via reservoir opening 15. Reservoir opening 15 is typically elongated along the direction or axis from reservoir opening 15 to reservoir rear wall 17 (e.g., the part of reservoir wall 12 that is furthermost from reservoir opening 15). A cross section of flexible liquid reservoir 10 may be approximately circular, or may be flattened (e.g., oval or elliptical).

Reservoir opening 15 constructed of a rigid material to enable reservoir opening 15 to remain open, or may be held open by a rigid ring, tube, or other structure. Reservoir opening 15 may be configured to fit or cooperate with a tube, port, nozzle, or connector of another component of a microgravity system. Reservoir opening 15 is shown as connected to external tube 24. For example, external tube 24 may represent a conduit for conducting a liquid from flexible liquid reservoir 10 to another component of a microgravity system.

Flexible liquid reservoir 10 includes central linear structure 16. Central linear structure 16 includes rigid walls 18 interspersed with fluid openings 20, with a hollow bore forming central channel 19. Central linear structure 16, and thus central channel 19, extends from near reservoir opening 15 to reservoir rear wall 17. Central linear structure 16 is designed enable conduction of liquid from any point within flexible liquid reservoir 10 to reservoir opening 15 via central channel 19 when flexible liquid reservoir 10 is in a microgravity environment For example, central linear structure 16 may have the form of a cylindrical tube with mostly solid walls forming rigid walls 18. A central bore or space of the cylindrical tube forms central channel 19. The wall of the tube includes perforations (e.g., circular or otherwise-shaped holes) that form fluid openings 20. The perforations are distributed along the length of rigid walls 18 and on various sides of central linear structure 16. The cross section of the cylindrical tube may be substantially circular or may have another shape. Rigid walls 18 may be made of a semi-rigid (e.g., capable of holding its shape while enabling central linear structure 16 to bend to some extent) or rigid plastic, metal, or other material that is capable of holding its shape when reservoir wall 12 collapses about central linear structure 16 (e.g., due to applied suction via reservoir opening 15).

As another example, central linear structure 16 may include one or more semi-rigid or rigid bars running the length of flexible liquid reservoir 10. Rigid walls 18 may consist of a plurality of ribs in the form of rings or hoops (forming a "ribcage") that extend around a single bar (e.g., connected to the bar by axial hoops), or whose perimeters are attached to one or more parallel bars. The spaces between the ribs thus form fluid openings 20.

Central linear structure 16 may include another type of structure, or a combination of these exemplary structures, that forms a linear structure with rigid walls 18 and fluid openings 20.

In the case that is schematically illustrated in FIG. 1, flexible liquid reservoir 10 is partially filled with a liquid while being subjected to suction via reservoir opening 15, e.g., as applied to external tube 24, e.g., by a suction pump. Due to the suction, neck 14 of reservoir wall 12 (designating the portion of reservoir wall 12 that is adjacent to reservoir opening 15) is collapsed about central linear structure 16. The remaining liquid contents of flexible liquid reservoir 10 are held in open volume 22 of flexible liquid reservoir 10. As shown, central linear structure 16 has prevent complete collapse of neck 14. (In the absence of central linear structure 16, walls of neck 14 could completely close upon one another, and thus could completely block passage of liquid from open volume 22 to reservoir opening 15.) Thus, liquid in open volume 22 could pass into central channel 19 of central linear structure 16 via fluid openings 20. The liquid may then be conducted within central channel 19 via neck 14 to reservoir opening 15, and thus to external tube 24.

Figure 2:
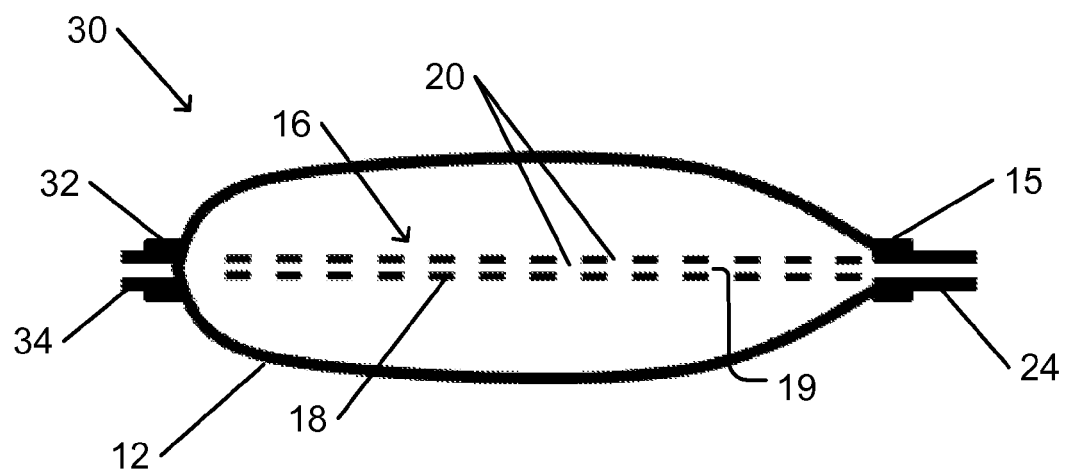
FIG. 2 schematically illustrates a flexible liquid reservoir with a linear central structure for use with a microgravity system with separate inlet and outlet openings, in accordance with an embodiment of the present invention.

FIG. 2 schematically illustrates a flexible liquid reservoir with a linear central structure for use with a microgravity system with separate inlet and outlet openings, in accordance with an embodiment of the present invention.

Flexible liquid reservoir 30 is similar to flexible liquid reservoir 10 (FIG. 1), with additional opening 32. For example, reservoir opening 15 may function as an outlet port for connection to external tube 24 for conduction of liquid from within flexible liquid reservoir 10 to another component of a microgravity system. In this case, additional opening 32 (shown as closed) may function as an inlet port. External tube 34 that is connected to additional opening 32 may then be configured to conduct liquid from a supply of the liquid. In some cases, reservoir opening 15 may function as an inlet port and additional opening 32 may function as an outlet port. In some cases, reservoir opening 15, additional opening 32, or both, may be provided with a one-way valve to limit the function of each opening to serve exclusively as either an inlet port or an outlet port.

Central linear structure 16 extends from reservoir opening 15 to additional opening 32. Thus, flexible liquid reservoir 30 may be either emptied or filled in the microgravity environment.

In some cases, flexible liquid reservoir 30 may be filled outside of the microgravity environment (e.g., prior to being launched or otherwise placed in the microgravity environment), e.g., from a tank or other supply of the liquid. After filling, the inlet port (e.g., additional opening 32) may be closed, and the outlet port (e.g., reservoir opening 15) may be opened. In some cases, flexible liquid reservoir 30 may serve to collect a product liquid via an inlet port (e.g., liquid that was created by a chemical, physical, biological reaction or interaction during a process in the microgravity system, which may include a waste liquid that is to be discarded). In such a case, flexible liquid reservoir 30 may be emptied later via an outlet port.

In accordance with an embodiment of the present invention, a central linear structure may include a plurality of rigid substantially parallel axially elongated radial projections. In this case, channels for conducting the liquid from one end of the flexible liquid reservoir to the other may be formed between the parallel projections.

Figure 3A:
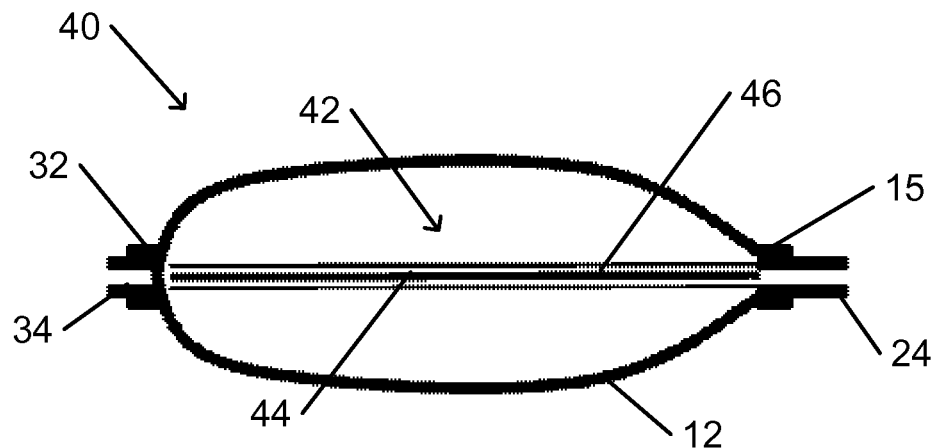
FIG. 3A schematically illustrates a side view of a flexible liquid reservoir having a linear central structure with axially elongated parallel projections, in accordance with an embodiment of the present invention.
Figure 3B:
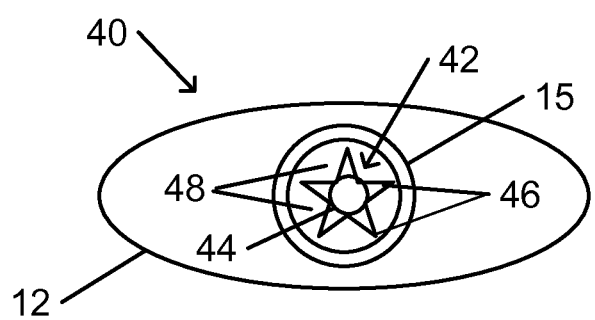
FIG. 3B schematically illustrates a view of an end of the flexible liquid reservoir shown in FIG. 3A.

FIG. 3A schematically illustrates a side view of a flexible liquid reservoir having a central structure with axially elongated parallel projections, in accordance with an embodiment of the present invention. FIG. 3B schematically illustrates a view of an end of the flexible liquid reservoir shown in FIG. 3A.

In flexible liquid reservoir 40, the central linear structure 42 includes a central axial bar 44. A plurality of axially elongated parallel projections in the form of longitudinal fins 46 extend substantially radially from central axial bar 44. (As used herein, the longitudinal direction or dimension of a flexible liquid reservoir refers to a direction or dimension that is approximately parallel to a desired general direction of fluid flow within the reservoir to its reservoir opening 15. For example, the longitudinal direction may be approximately of a line or curve that connects reservoir opening 15 with additional opening 32 or with reservoir rear wall 17. A transverse direction or section refers to a direction or section that is approximately perpendicular to the longitudinal direction.) Although longitudinal fins 46 are shown as pointed wedges (resembling points of star), the longitudinal fins may have a flat or curved profile, and the distal ends may terminate in a rounded, flat, or other shape.

Longitudinal channels 48 are formed between pairs of adjacent longitudinal fins 46. As seen in the end view in FIG. 3B, where central linear structure 42 is viewed via reservoir opening 15 (or, alternatively and equivalently, via additional opening 32), longitudinal fins 46 are configured to prevent complete collapse of reservoir wall 12 onto central linear structure 42. Thus, longitudinal fins 46 are configured to maintain longitudinal channels 48 in a condition that is not blocked by collapse of reservoir wall 12. Thus, liquid may flow via one of longitudinal channels 48 from one end of flexible liquid reservoir 40 to the other (e.g., from near reservoir opening 15 to near additional opening 32, or vice versa). Liquid may flow into one of longitudinal channels 48 anywhere along the length of that longitudinal channel 48.

Although longitudinal fins 46 and longitudinal channels 48 are shown as symmetrically distributed about central axial bar 44, the longitudinal fins may be asymmetrically distributed to some extent. However, symmetrical distribution may be advantageous such that liquid may readily flow into one of longitudinal channels 48 from any radial direction with minimal obstruction.

Although five symmetrically distributed longitudinal fins 46 and longitudinal channels 48 are shown, a central linear structure 42 may include more or fewer longitudinal fins and channels that extend from central axial bar 44. However, when the longitudinal fins and channels are symmetrically distributed, at least three longitudinal fins may be required to maintain the resulting longitudinal channels in an open condition in the case of collapse of reservoir wall 12. More than three longitudinal fins may be required to maintain the resulting longitudinal channels in a mostly open condition. (Two closely spaced longitudinal fins may be sufficient to maintain a single longitudinal channel. However, access to such a channel in the event of collapse of reservoir wall 12 may be possible from only one side of central axial bar 44.)

In accordance with an embodiment of the present invention, an internal mechanical structure of a flexible liquid reservoir may include internally ribbed walls. For example, a plurality of distributed ribs may extend inward from walls of the flexible liquid reservoir. The ribs may be semi-rigid in that the ribs are sufficiently rigid to maintain a separation between walls of the flexible liquid reservoir in the event of collapse of the walls. The ribs may form channels that extend along the length of the flexible liquid reservoir for conduction of liquid from one end of the flexible liquid reservoir to the other. On the other hand, the ribs may be sufficiently flexible as to bend to some extent along with the flexible liquid reservoir.

Figure 4A:
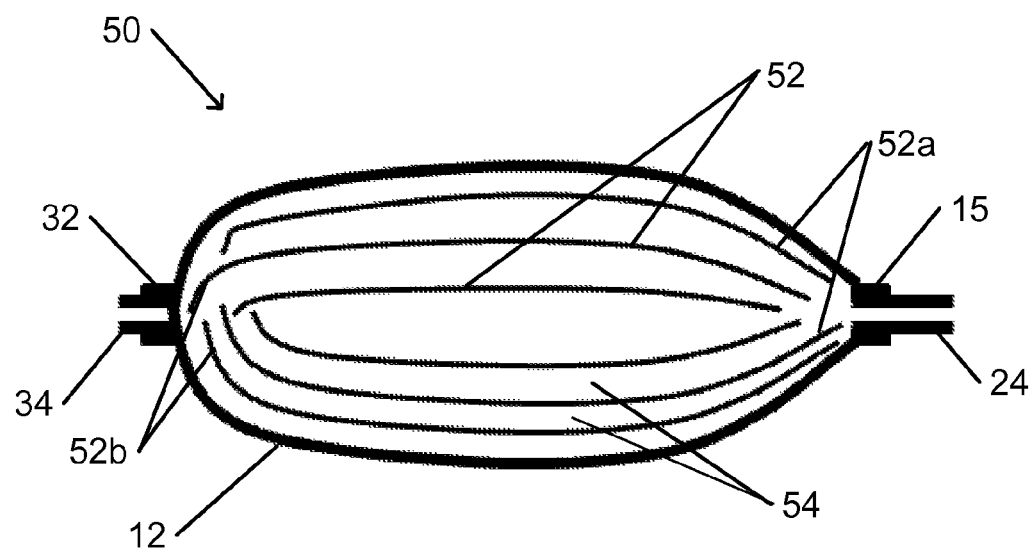
FIG. 4A schematically illustrates a side view of a flexible liquid reservoir having walls with internal longitudinal internal ribs, in accordance with an embodiment of the present invention.
Figure 4B:
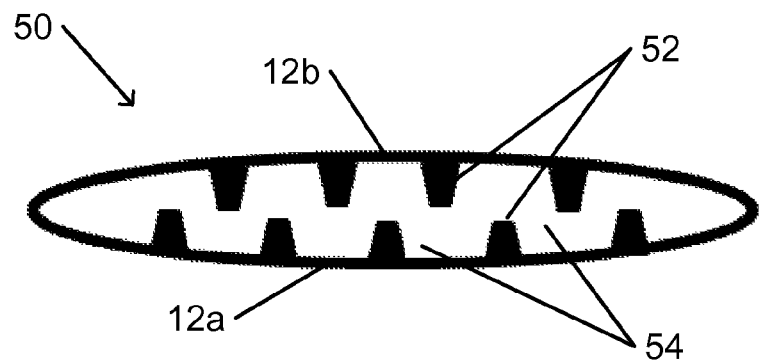
FIG. 4B schematically illustrates a transverse cross section of the flexible liquid reservoir shown in FIG. 4A.

FIG. 4A schematically illustrates a side view of a flexible liquid reservoir having walls with internal longitudinal internal ribs, in accordance with an embodiment of the present invention. FIG. 4B schematically illustrates a transverse cross section of the flexible liquid reservoir shown in FIG. 4A.

An inner surface of reservoir wall 12 of ribbed flexible liquid reservoir 50 includes longitudinal internal ribs 52. Longitudinal internal ribs 52 project inward from reservoir wall 12. For example, longitudinal internal ribs 52 may be constructed of a thickened section of a material of which reservoir wall 12 is constructed. Alternatively or in addition, longitudinal internal ribs 52 may be constructed of a material that is caused to adhere to the inner surface of reservoir wall 12. Longitudinal internal ribs 52 may be sufficiently flexible so as to be capable of bending with reservoir wall 12 as ribbed flexible liquid reservoir 50 is being filled or emptied.

Longitudinal internal ribs 52 are configured to prevent complete collapse of different sides of reservoir wall 12, such as wall sides 12a and 12b, inward upon one another. When reservoir wall 12 collapses, the spacing between wall sides 12a and 12b that is created by longitudinal internal ribs 52 form a plurality of longitudinal channels 54. Longitudinal channels 54 extend approximately longitudinally along the longitudinal axis of ribbed flexible liquid reservoir 50.

Longitudinal channels 54 are laterally dispersed laterally along reservoir wall 12 (e.g., along wall sides 12a and 12b). Therefore, liquid contents within most or all of the interior volume of ribbed flexible liquid reservoir 50 are squeezed by one or more of longitudinal internal ribs 52 into one of longitudinal channels 54 when reservoir wall 12 collapses. Ends 52a and 52b of longitudinal internal ribs 52 may be curved toward an opening of ribbed flexible liquid reservoir 50, such as reservoir opening 15 or additional opening 32. Therefore, longitudinal channels 54 provide an unblocked path to enable conduction of liquid from anywhere, or from almost anywhere, within ribbed flexible liquid reservoir 50 to reach one or both of reservoir openings 15 or additional opening 32 when reservoir wall 12 is collapsed.

One or more ribbed flexible liquid reservoirs, in accordance with an embodiment of the present invention, may be utilized in a microgravity fluid-handling system. The microgravity fluid-handling system includes one or more flexible liquid reservoirs, and a system of conduits to conduct a liquid (e.g., a reagent) form the flexible liquid reservoirs to a chamber in which a process takes place. For example, the process chamber may be incorporated in a microfluidic chip that utilizes lab-on-a-chip technology.

Figure 5:
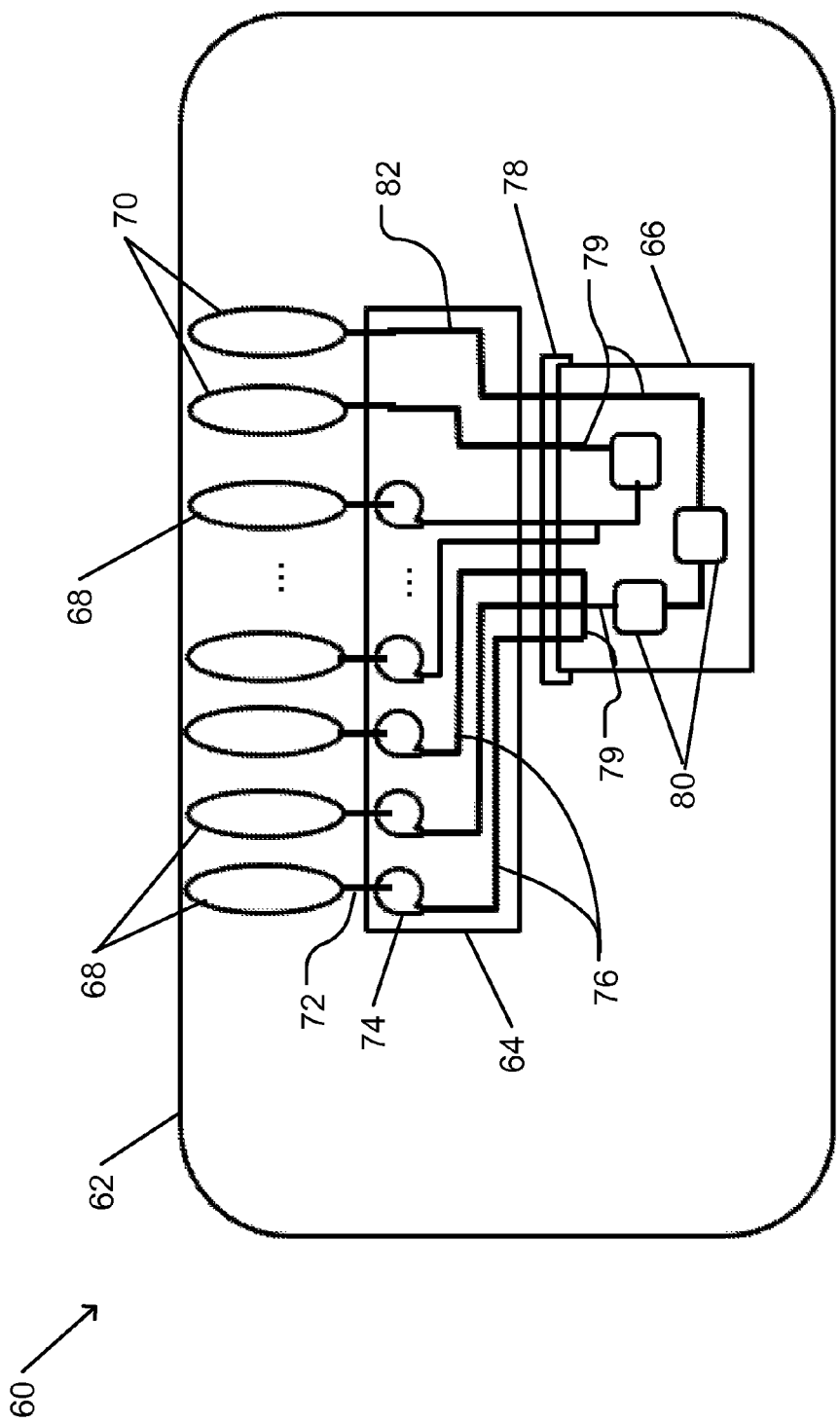
FIG. 5 schematically illustrates a microgravity fluid-handling system that includes a flexible liquid reservoir, in accordance with an embodiment of the present invention.

FIG. 5 schematically illustrates a microgravity fluid-handling system that includes a flexible liquid reservoir, in accordance with an embodiment of the present invention.

Microgravity fluid-handling system 60 is configured for placement in a microgravity environment. Microgravity fluid-handling system 60 may be enclosed in a pressure chamber 62. Enclosing microgravity fluid-handling system 60 in pressure chamber 62 may enable microgravity fluid-handling system 60 to operate in a region where the ambient environment is insufficient to enable operation of pumps or other devices for transfer of liquids. For example, pressure chamber 62 may enable operation of microgravity fluid-handling system 60 on a satellite, spacecraft, or space station in earth orbit or elsewhere outside of earth's atmosphere. Pressure chamber 62 may enable microgravity fluid-handling system 60 to operate in a constant manner despite changes in ambient atmospheric pressure, e.g., in free fall or in an aircraft that is flying in a parabolic arc.

Pressure chamber 62 may be configured to be mounted in an appropriate fixture for placement in the microgravity environment. For example, pressure chamber 62 may be configured for placement in a rack system, or may be configured as a module for attachment to other modules in a modular system. Pressure chamber 62 may include one or more connections or ports to enable electrical or data connections to an external power source or communications or processing system. Pressure chamber 62 may include one or more ports, removable panels, hatches, or doors to enable access to microgravity fluid-handling system 60, e.g., prior to placement in the microgravity environment (e.g., to fill one or more flexible reagent liquid reservoirs 68 with a reagent) or after return from the microgravity environment (e.g., to drain one or more flexible product liquid reservoirs 70).

Microgravity fluid-handling system 60 is configured to transfer one or more reagents from flexible reagent liquid reservoirs 68 via manifold block 64 to microfludic chip 66. One or more chemical or biological reactions may occur in one or more chambers 80 of microfludic chip 66. Microfludic chip 66 may include one or more sensors (e.g., incorporated into chambers 80) to enable recording or analysis of the reaction or of a result of the reaction. Results of the reaction may be conducted to one or more flexible product liquid reservoirs 70 (which may be identical in construction to flexible reagent liquid reservoirs 68).

Each flexible reagent liquid reservoir 68 may be configured to hold a liquid reagent or other liquid. For example, each flexible reagent liquid reservoir 68 may have a capacity of about a few milliliters (e.g., from about 1 ml to about 3 ml) (e.g., with a length of about 90 mm and a lateral size or width of about 30 mm), or another suitable size. An outlet port of each flexible reagent liquid reservoir 68 is connected to a manifold input tube 72 for input of the fluid into manifold block 64. A microgravity fluid-handling system 60 may include fewer than or more than five flexible reagent liquid reservoirs 68 as shown (additional flexible product liquid reservoirs 70 and pumps 74 are represented by the ellipsis dots in FIG. 5). In some cases, a microgravity fluid-handling system 60 may accommodate up to four 1 ml or 3 ml flexible reagent liquid reservoirs 68 and flexible product liquid reservoirs 70.

Manifold block 64 includes one or more pumps 74 for applying suction to flexible reagent liquid reservoirs 68. Application of the suction to flexible reagent liquid reservoirs 68 may extract liquid contents from a flexible reagent liquid reservoir 68 into manifold block 64. Application of the suction typically is expected to cause a flexible reagent liquid reservoir 68 to contract in size by causing the walls of that flexible reagent liquid reservoir 68 to collapse inward.

Pumps 74 may also provide pressure to cause a liquid that is extracted from a flexible reagent liquid reservoir 68 to flow through reagent conduits 76 and chip conduits 79 to one or more chambers 80 of microfludic chip 66. The pressure may also cause a product liquid that is produced by a process in one or more chambers 80 to flow via chip conduits 79 and product liquid conduits 82 to flexible product liquid reservoirs 70.

Some or all of reagent conduits 76, chip conduits 79, and product liquid conduits 82 may be constructed of a material that is impermeable to, and nonreactive with, one or more liquid reagents. Similarly, some or all of reagent conduits 76, chip conduits 79, and product liquid conduits 82 may be impermeable to air or another ambient gas, or to gaseous component of a reagent or product liquid. Some or all of reagent conduits 76, chip conduits 79, and product liquid conduits 82 may be biocompatible with a biological component of a reagent or product liquid.

Each flexible reagent liquid reservoir 68 includes internal structure for enabling extraction of liquid from its interior when suction is applied to that flexible reagent liquid reservoir 68. For example, each flexible reagent liquid reservoir 68 may include one or more of a central linear structure 16 with a perforated tube (FIGS. 1-2), a central linear structure 42 with longitudinal fins 46 (FIGS. 3A-3B), or may be provided with longitudinal internal ribs 52 (FIGS. 4A-4B). The internal structure prevents complete collapse of the walls of flexible reagent liquid reservoir 68, thus enabling continued extraction of liquid contents of that flexible reagent liquid reservoir 68 after its walls collapse inward.

Pumps 74 of manifold block 64 pump liquid contents of flexible reagent liquid reservoirs 68 into reagent conduits 76. For example, each reagent conduit 76 may have a lateral dimension (e.g., diameter, width, or depth) in the range of about 100 µm to about 200 µm, or another suitable dimension.

Reagent conduits 76 of manifold block 64 may connect to microfludic chip 66 at chip connector 78. For example, each reagent conduit 76 may terminate in an external nozzle or plug. Chip connector 78 may include one or more sockets that are coordinated with the external nozzles or plugs to form a sealed connection between each reagent conduit 76 and chip connector 78.

Microfludic chip 66 may be designed for a particular process (e.g., experiment or production). Thus, the arrangement of chip conduits 79 and of chambers 80 on microfludic chip 66 may be designed to create a particular series of reactions and reaction products. For example, chip conduits 79 may be arranged to conduct a particular combination of reagents (or of reaction products from other chambers 80) to a particular chamber 80. A chamber 80 may be configured to facilitate a particular reaction. For example, a chamber 80 may be provided with an energy source (e.g., heater, photonic irradiation, electric current or voltage, or other energy source), or may be provided with an appropriate heat or energy sink.

One or more product liquids (e.g., a product that is to be saved for later use or a waste liquid that is to be discarded) may be conducted from a chamber 80 via one or more chip conduits 79. The product liquid may be conducted via chip connector 78 and product liquid conduits 82 to flexible product liquid reservoirs 70.

Flexible product liquid reservoirs 70 may be arranged in a parallel (e.g., staggered) row to flexible reagent liquid reservoirs 68 so as to minimize the space that is occupied by flexible reagent liquid reservoirs 68 and flexible product liquid reservoirs 70.

Different embodiments are disclosed herein. Features of certain embodiments may be combined with features of other embodiments; thus certain embodiments may be combinations of features of multiple embodiments. The foregoing description of the embodiments of the invention has been presented for the purposes of illustration and description. It is not intended to be exhaustive or to limit the invention to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the invention.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. A liquid reservoir for use in a microgravity environment, the reservoir comprising:
    a bladder for holding a liquid, the bladder including flexible walls and an opening for extraction of the liquid from the bladder; and
    a central internal tubular structure that is shaped so as to form at least one channel to conduct the liquid from an end of the bladder that is distal to the opening, wherein the central internal tubular structure is sufficiently rigid to prevent the walls of the bladder from blocking said at least one channel when suction is applied to the opening, and wherein the flexible walls of the bladder are away from the central internal tubular structure when the bladder is filled and come in contact with the central internal tubular structure when at least partially collapsed, and
    wherein the bladder further comprises an additional opening at an end thereof that is distal to the opening.

2. The reservoir of claim 1, wherein the channel comprises a hollow interior of the central internal tubular structure.

3. The reservoir of claim 2, wherein the central internal tubular structure extends from the opening to the distal end.

4. The reservoir of claim 2, wherein the central internal tubular structure includes a plurality of perforations distributed along the length thereof to enable the liquid to enter the channel through the perforations.

5. A liquid reservoir for use in a microgravity environment, the reservoir comprising:
    a bladder for holding a liquid, the bladder including flexible walls and an opening for extraction of the liquid from the bladder; and
    a central internal tubular structure that is shaped so as to form at least one channel to conduct the liquid from an end of the bladder that is distal to the opening, wherein the central internal tubular structure is sufficiently rigid to prevent the walls of the bladder from blocking said at least one channel when suction is applied to the opening, and wherein the flexible walls of the bladder are away from the central internal tubular structure when the bladder is filled and come in contact with the central internal tubular structure when at least partially collapsed,
    wherein the central internal tubular structure comprises a plurality of projections that extend laterally, and wherein each of said plurality of projections comprises a longitudinal fin, and
    wherein each channel of said at least one channel is formed between each pair of adjacent fins.

\* \* \* \* \*